United States Patent [19]

Shaw et al.

[11] Patent Number: 5,050,985
[45] Date of Patent: Sep. 24, 1991

[54] FILM DECELERATION UNIT

[75] Inventors: William C. Shaw, Streetsville; Ian Maxwell, Oakville; Irvine W. Smith, Cooksville, all of Canada

[73] Assignee: Imax Systems Corporation, Toronto, Canada

[21] Appl. No.: 605,319

[22] Filed: Oct. 30, 1990

[51] Int. Cl.$^5$ ................................................ G03B 1/00
[52] U.S. Cl. ..................................... 352/184; 352/182
[58] Field of Search ................. 352/166, 184, 180, 182

[56] References Cited

U.S. PATENT DOCUMENTS

3,600,073 8/1971 Shaw .................................. 352/184

Primary Examiner—Monroe H. Hayes
Attorney, Agent, or Firm—Rogers, Bereskin & Parr

[57] ABSTRACT

A projector having a rolling loop film transport mechanism is provided with a film decelerating cam unit that is located in advance of the aperture of the projector. Deceleration pins carried by a pair of vertically spaced arms that project from the cam unit engage in upper and lower marginal perforations in the film and travel with the film towards the aperture and decelerate the film as each frame is advanced. The cam unit includes two cams, one of which causes the decelerating motion of the pins, and a return motion in the reverse direction, while the other cam causes the pins to advance and retract into and from the film path respectively. By positively retracting the pins, their return movement against the direction of film travel can take place independent of the motion of the film. As compared with the prior art, acceleration forces and resultant stresses on the cam are reduced and the cam unit can operate at higher frame rates and/or with smaller rotor gaps.

10 Claims, 5 Drawing Sheets

FILM DECELERATION UNIT

FIELD OF THE INVENTION

This invention relates generally to film projectors, cameras and like apparatus having a film transport mechanism of the type which has become known as the "rolling loop" mechanism.

BACKGROUND OF THE INVENTION

U.S. Pat. No. 3,494,524 (Jones) discloses the principle of a rolling loop film transport mechanism. The mechanism includes a curved stator and a rotor which cooperate to define a film passage. The rotor has gaps in which loops of film are continuously formed as the rotor rotates. Each loop is developed by feeding film from an input sprocket into a gap in the rotor as the gap travels from a film inlet location to the aperture, and the loop decays progressively as the gap travels from the aperture to a driven output sprocket. Successive portions of the film (frames) are held stationary at the aperture for projection or exposure, as the case may be, on one or more registration pins.

A number of improvements in the original Jones mechanism are disclosed in U.S. Pat. No. 3,600,073 to Shaw. The disclosure of the Shaw patent is incorporated herein by reference. One such improvement involves the provision of a cam unit in advance of the aperture for engaging and decelerating the film so that the film is laid smoothly onto the registration pin or pins. In other words, the cam unit minimizes or reduces the impact forces which would otherwise be imposed on the film as the film strikes the registration pins. Those impact forces can cause damage to the film around the perforations in which the registration pins engage. This effect is particularly severe at high frame rates and with large formats.

The cam unit disclosed in the Shaw patent has movable film engaging pins that are reciprocated back and forth in the film path by a cam. As successive film loops travel past the cam unit, the film is laid onto the film decelerating pins and the pins move with the film and decelerate the film, so that the film is laid smoothly onto the registration pins at the aperture for projection or exposure as the case may be. The deceleration pins then remain in engagement with the film until the next rotor gap approaches the cam unit. As the loop in that gap passes by the cam unit, a portion of the film at the leading edge of the loop is lifted off the cam unit pins and a portion of the film at the trailing edge of the loop is subsequently laid onto those pins, ready for the deceleration cycle to be repeated. In the time that the rotor gap passes by the cam unit, the deceleration pins must be returned in a direction against the direction of film travel ready to re-engage the film.

This cycle of movement of the film decelerating pins requires abrupt acceleration and deceleration of the pins, and changes of direction that impose severe loads on the moving parts of the cam unit. This not only imposes a requirement for high precision and high quality components in the manufacture of the unit but service life maintenance requirements are high. Also, these requirements impose practical limits on the design criteria for the projector or camera itself, for example in terms of minimum rotor gap width and the frame rate at which the apparatus can be operated. In the case of a projector, it is generally desirable to operate at high frame rates so as to reduce noticeable "flicker" and to reduce the gap width so as to achieve a brighter projected image. Image brightness is affected by gap width because, in a rolling loop mechanism, the film is transported as the gap passes the aperture and each gap is therefore provided with a shutter that obscures the projected light as the gap moves across the aperture.

BRIEF DESCRIPTION OF THE INVENTION

An object of the present invention is to provide improved film decelerating means.

Broadly considered, the invention provides a film deceleration unit for a projector, camera and like apparatus having a rolling loop film transport mechanism. The apparatus has an aperture at which successive portions of the film transported by the mechanism are intermittently held stationary in registration with the aperture and the unit is located in advance of the aperture for decelerating the film as it approaches the aperture. The unit includes deceleration pin means releasably engageable in marginal perforations in the film, and means for driving the pin means in a cycle of movement in which the pin means is moved into the film path at a film engaging position, in the direction of film travel to a film disengaging position while decelerating the film, is withdrawn from the film path and then returned in a direction against the direction of film travel to the film engaging position, while remaining out of the film path. The cycle of movement of the deceleration pin means is synchronized with the film transport mechanism so that each of the said successive portions (frames) of the film is decelerated as it approaches the aperture.

By positively retracting the deceleration pin means from the film instead of waiting for the film to be lifted off the pins as in the prior art, movement of the pin means can be made to take place in a much more leisurely fashion, with consequent reduction in acceleration forces and resultant stresses on the internal components of the deceleration unit. The unit can also be designed to operate at much higher frame rates and/or with narrower rotor gaps than was hitherto possible.

Preferably, the deceleration unit is a cam unit having first and second cam means, one of which is arranged to reciprocate the deceleration pins in the direction of film travel and counter to that direction, and the other of which reciprocates the pins between said advanced and retracted positions (into and out of the film path).

BRIEF DESCRIPTION OF DRAWINGS

In order that the invention may be more clearly understood, reference will now be made to the accompanying drawings which illustrate particular preferred embodiments of the invention by way of example, and in which:

FIGS. 3 and 4 each comprise two corresponding velocity profiles denoted (a) and (b) for respective cam units in accordance with the invention, having alternative cam configurations;

DESCRIPTION OF PRIOR ART

Figure 1:
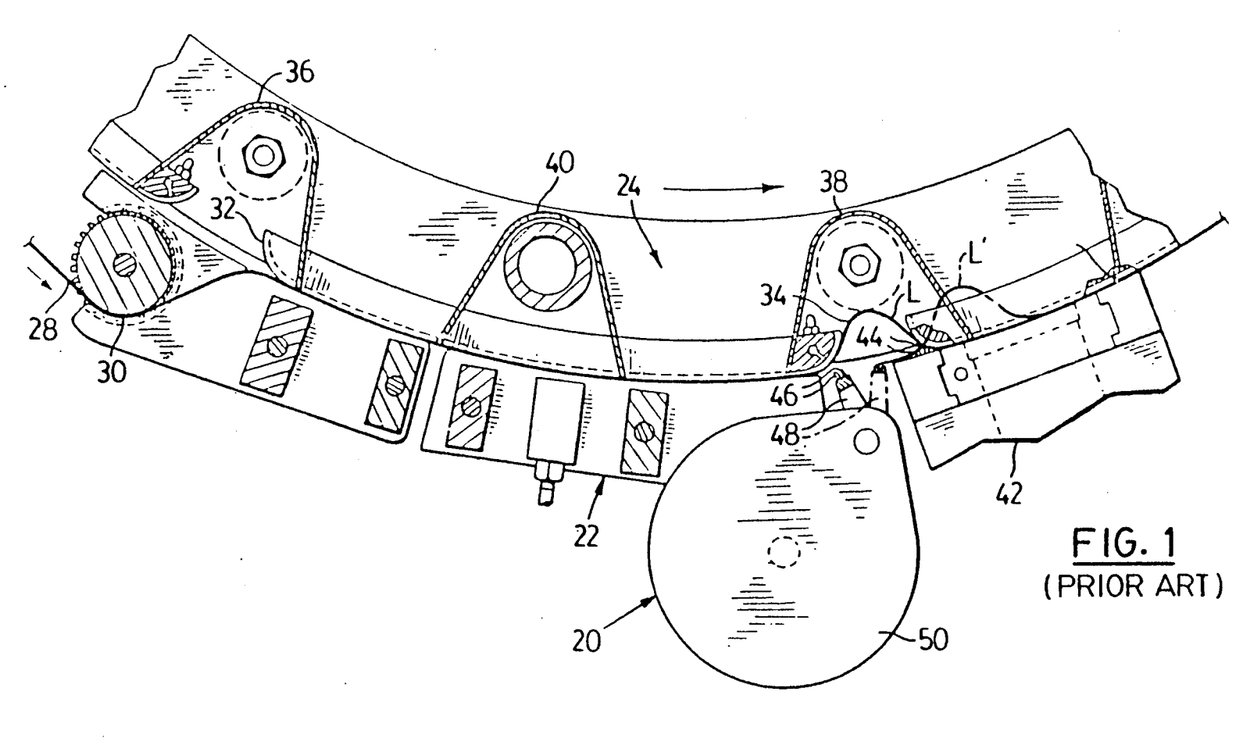
FIG. 1 is a diagrammatic plan view of a cam unit of the form disclosed in the Shaw patent discussed previously, shown in association with a portion of a rolling loop projector.

Referring first to FIG. 1, a cam unit 20 is shown mounted on the stator 22 of a rolling loop projector which also has a rotor 24. The stator and rotor together define a film path 26 and a film 28 is shown being fed into film path 26 by an input sprocket 30. As is described in detail in the Shaw patent, rotor 24 has a series of spaced gaps around its perimeter. As the rotor rotates, film is fed into successive gaps by the input sprocket 30 so that loops of film are formed and progressively grow in the gaps. The loops are advanced past an aperture by rotation of the rotor and then progressively decay until the film returns to a flat configuration in which it is expelled from the rolling loop mechanism. In FIG. 1, two of the rotor gaps are visible and are denoted respectively by reference numerals 32 and 34. A film loop in gap 34 is denoted L. Curved plates that comprise primary shutters of the projector are secured to the inner surface of the rotor behind each of the gaps and are denoted respectively 36 and 38 in FIG. 1. An intermediate flicker shutter plate is indicated at 40.

In the position of the rotor that is shown in FIG. 1, gap 34 is approaching a stationary aperture plate 42 at which projection of the film takes place. Lenses and other components that form part of the projection system have not been shown. Fixed film registration pins 44 are provided at the side of the aperture block nearest the input sprocket 30 and serve to ensure proper registration of successive film frames for projection. These pins engage in the two sets of perforations (not shown) that are typically provided along respective side margins of a motion picture film. In the position of FIG. 1, film loop L is beginning to travel across the aperture block. The leading edge of the loop is being lifted from the registration pins 44 by movement of the rotor. Projection of a frame at the aperture is just ending and the primary shutter 38 is starting to move across the projection beam (not shown).

As indicated previously, cam unit 20 serves to decelerate the film as it approaches the aperture block so that the film is laid smoothly onto the registration pins 44 with minimum impact shock. The cam unit includes deceleration pins 46 which engage in the marginal perforations in the film "upstream" of the aperture block and then move with and decelerate the film. The deceleration pins are carried by an arm 48 that projects from a cam housing 50. A cam wheel (not shown) inside the housing drives the arm and hence the deceleration pins. The cam action is described in detail in the Shaw patent but for present purposes it is sufficient to note that the cam is designed to cause arm 48 and, with it, the pins 46, to simply reciprocate back and forth in the film path in synchronism with the rotation of rotor 24.

In FIG. 1, arm 48 is shown in a position just prior to engaging the film. The portion of the film at the trailing end of loop L is laid onto the deceleration pins 46 as the loop travels towards the aperture plate. Arm 48 is also shown in ghost outline in the position it occupies at the other end of its reciprocatory movement. A corresponding position for the film loop is also shown in ghost outline at L'. Referring to the full line position of arm 48, as rotor 24 continues to rotate, arm 48 moves in the direction of film travel at a speed less than the film allowing the film to catch up with arm 48 and allowing the pins 46 to engage the perforations with nominal, non-damaging impact. The arm then moves with the film towards the aperture block at decreasing velocity and decelerates the film. The pins 46 remain in engagement with the film as the film loop is laid onto the fixed registration pins 44 at the aperture. Arm 48 is then in the position shown in ghost outline and remains in this position until the next loop approaches. The film at the leading end of that loop is lifted off the deceleration pins as the loop travels by. As soon as the film has disengaged from the deceleration pins 46, arm 48 is returned to the full line position of FIG. 1 and the trailing end of the same loop is laid onto the pins.

Figures 2, 3A, 3B:
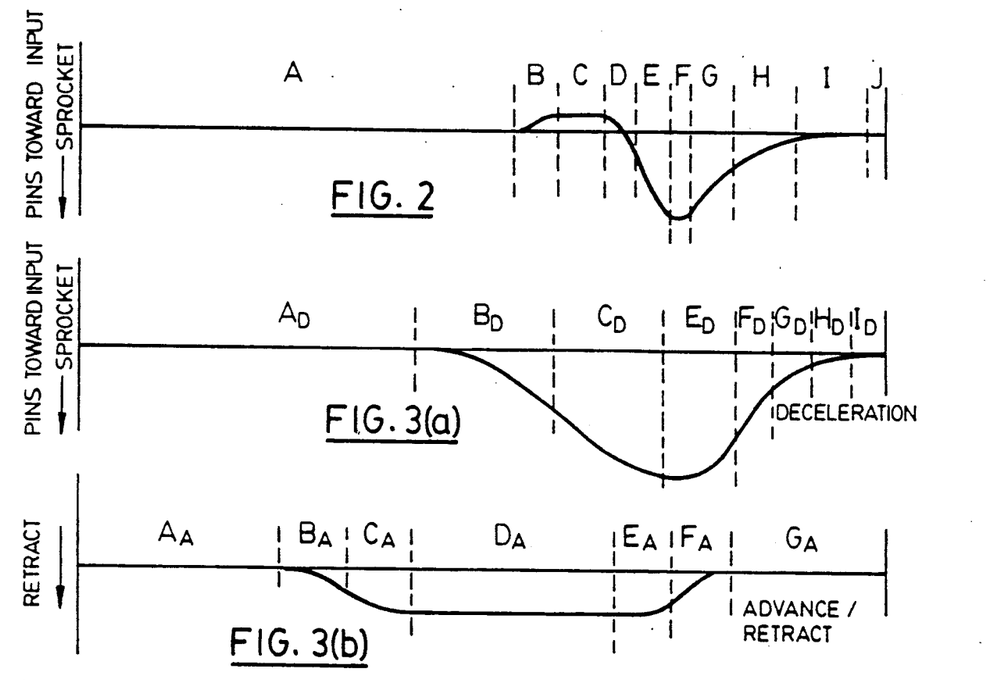
FIG. 2 is a velocity profile illustrating movement of the film deceleration pins of the cam unit shown in FIG. 1.

FIG. 2 is a velocity profile illustrating the movement of the deceleration pins 46 during one complete cycle of the cam within cam unit 20. This is also the time that passes during the registration and projection of one film frame. The velocity profile has been divided into angular segments denoted A to J and the phases of movement of the cam during those segments are as follows:

| Angular Segment | Phase |
| --- | --- |
| A | Dwell - cam pins stationary during image projection and flicker shutter passing aperture. |
| B | Accelerate cam pins forward (direction of film travel). Decelerate cam pins to dwell - to clear pins from perforation edges to allow loop to pass. |
| C | Dwell - during passage of leading portion of loop. |
| D | Accelerate cam pins in reverse. |
| E | Decelerate cam pins to stop. |
| F | Accelerate cam pins forward, up to approximately 70% of film velocity. |
| G | Move cam pins forward at constant velocity while pins engage perforations. |
| H | Decelerate cam pins and film to a low velocity forward. |
| I | Move cam pins and film forward at low constant velocity to engage film against register pins. |
| J | Decelerate cam pins to dwell. |

It will be understood from the foregoing that angular segments D, E, F and part of G of the deceleration pin motion must occur within the width of the film loop, after the film has been lifted off the deceleration pins. Accordingly, the acceleration and deceleration forces on the components of the cam unit are high and the cam follower bearing (not shown) is heavily stressed.

DESCRIPTION OF PREFERRED EMBODIMENTS

Figures 4A, 4B:
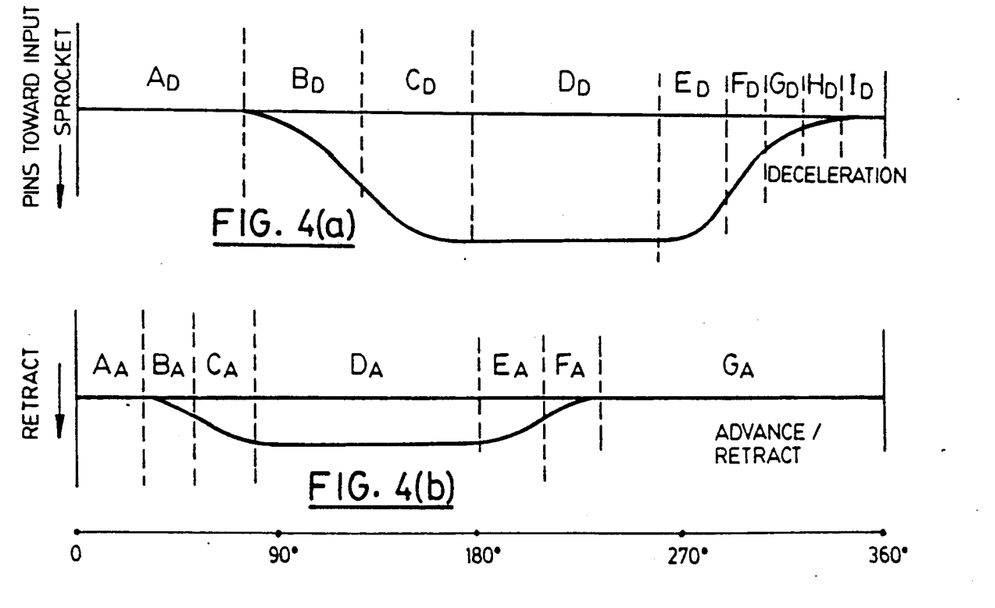

Reference will now be made to FIGS. 3 to 8 in describing a cam unit in accordance with the invention, which has been designed with the aim of ameliorating these difficulties and/or allowing higher frame rates and/or smaller rotor gaps for higher shutter efficiency. The cam unit of the invention may be substituted for the prior art cam unit 20 shown in FIG. 1, without the need for significant modification of the projector. Accordingly, reference will be made to FIG. 1 in describing the operation of the cam unit of the invention. FIGS. 3 and 4 illustrate the velocity profiles that may be achieved with two alternative cam configurations in the cam unit, and will be described later.

Figure 5:
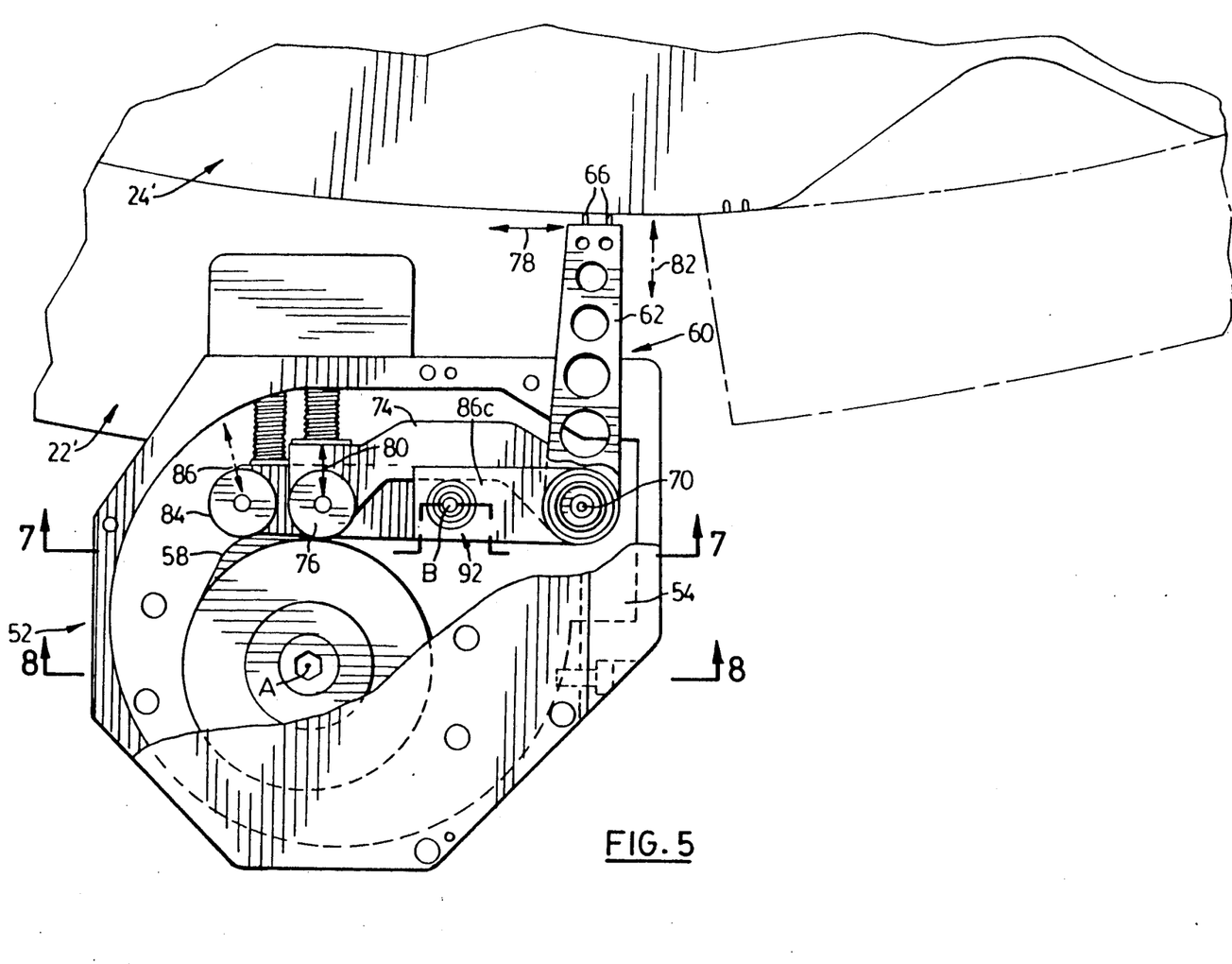
FIG. 5 is a plan view of a typical such cam unit.

Referring first to FIG. 5, the cam unit is generally denoted by reference numeral 52 and is shown mounted on part of the stator 22' of a rolling loop projector having a rotor 24'. The projector is essentially the same as the projector disclosed in the Shaw patent supra, except for the cam unit. In FIG. 5, part of a top cover plate 54 of the cam unit has been broken away to show internal components. In this embodiment, the cam unit has upper and lower cams 56 and 58 respectively (see FIG. 8) and a cam arm assembly 60 which includes followers for the two cams and which is shown separately in FIG. 6. The two cams are arranged in superposed positions and are rotatable about a common vertical axis A—A (see FIG. 8) parallel to the rotational axis of rotor 24'.

Figure 6:
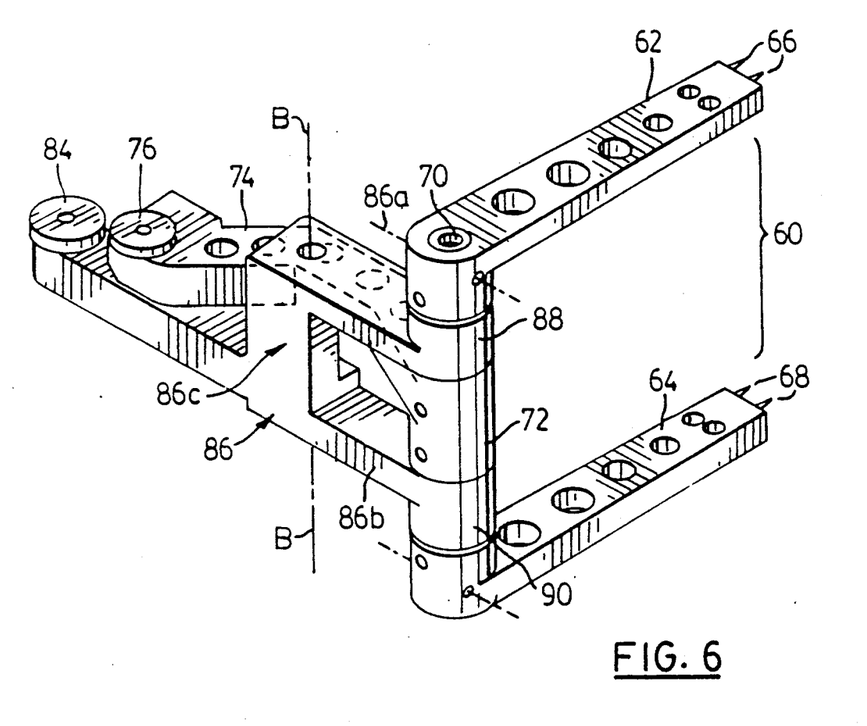
FIG. 6 is a detail view of part of the cam unit of FIG. 5.

Referring now to FIG. 6, assembly 60 includes upper and lower arms 62 and 64 respectively, outer end portions of which project from the cam unit housing as best shown in FIG. 5. A pair of deceleration pins project from the outer end of each arm and the pins in each pair are denoted respectively 66 and 68. The pairs of pins engage in adjacent ones of the respective upper and lower rows of perforations (not shown) in the film itself. At their inner ends (within the cam unit housing) the two arms are pinned to a vertical shaft 70. Also pinned to shaft 70, between the two arms, is a collar 72. Collar 72 is carried at one end of an arm 74 and a cam follower 76 is mounted at the opposite end of the arm. In the assembled cam unit, this follower 76 rides on the top cam 56 of the two cams within the cam unit. As can best be seen from FIG. 5, when the arm assembly is viewed in plan, arm 74 projects generally at right angles with respect to a common vertical plane containing the two arms 62, 64. Since the arms are pinned to the common shaft 70, they in effect form a lever crank with arm 74 so that movement of the cam follower 76 radially with respect to cam 56 causes corresponding reciprocatory movement of the outer ends of the arms 62 and 64 (carrying the registration pins 66 and 68) in the direction of and counter to the direction of film travel. This reciprocatory movement is indicated in FIG. 5 by a double-headed solid arrow denoted 78; the corresponding actuating movement of cam follower 76 is indicated by a similar arrow denoted 80.

Figure 8:
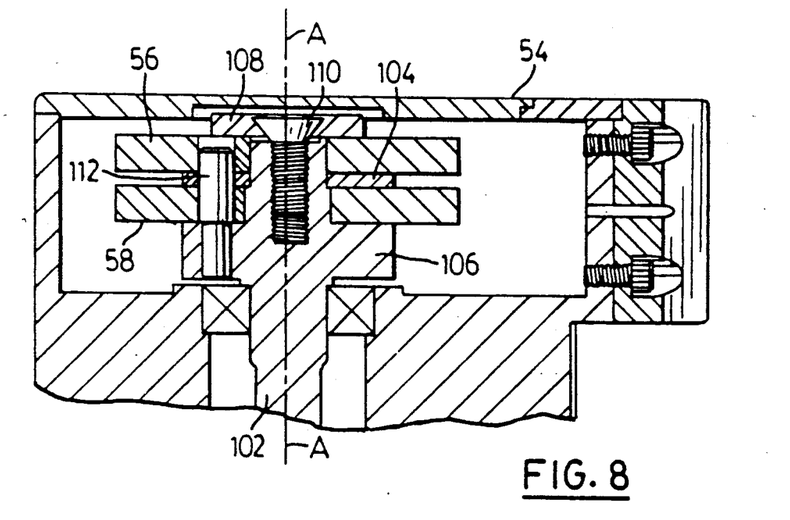

In addition to this reciprocatory motion, the pins 66 and 68 can be reciprocated into and out of the film path (between advanced and retracted positions) under the control of the second cam 58 of the cam unit (FIG. 8). In FIG. 5, this motion is indicated by the double-headed ghost outline arrow 82 and the corresponding movement of cam follower 84 in engagement with cam 58 (see later) is indicated by a similar arrow 86.

Figure 7:
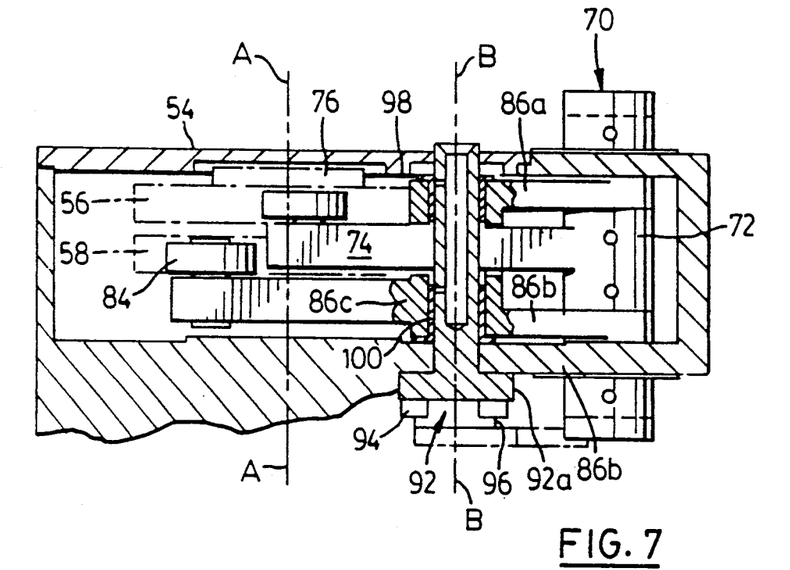
FIGS. 7 and 8 are sectional views respectively on lines 7—7 and 8—8 of FIG. 5.

Referring back to FIG. 6, it will be seen that cam follower 84 is carried at one end of a second arm 86, the opposite end of which is pivotally coupled to shaft 70 so that the arm can turn freely on the shaft. In other words, unlike the arms 62 and 64, arm 86 is not pinned to shaft 70. The end portion of arm 86 adjacent to shaft 70 is in fact bifurcated and has upper and lower portions 86a and 86b respectively, each of which carries at its outer end a collar that is turnably mounted on shaft 70. The collar for the upper portion 86a of arm 86 is denoted 88 while the corresponding collar for the lower arm portion is denoted 90. At their ends remote from the two collars 88 and 90, the two arm portions 86a and 86b are joined by a housing 86c for a pivot pin that is best shown in FIG. 7. In that view, the pin is denoted 92 and it will be seen that the pin is positioned vertically in the housing of the cam unit and defines an axis B—B parallel to the common rotational axis A—A of the two cams 56 and 58. It will be seen from FIG. 7 that pin 92 has at its lower end a head 92a that is secured to the cam housing by locking screws 94 and 96. The pin extends upwardly through respective openings in the arm portions 86a and 86b and respective bushings 98 and 100 are provided in those openings so that arm 86 can pivot freely with respect to pin 92.

Reference to FIG. 5 shows the location of pivot pin 92 with respect to shaft 70 and cam follower 84. It will be understood that movement of follower 84 generally radially of with respect to the axis A—A of the two cams 56 and 58 causes arm 86 to oscillate about pin 92 so that the cam unit rotation is translated to in and out movement of the deceleration pins as indicated by arrow 82. FIG. 5 also illustrates the fact that the other arm 74 of the cam arm assembly 60 has an angled shape selected to avoid pivot pin 92.

The two cams 56 and 58 are edge cams and are essentially flat disks having peripheral edges profiled to cause the respective followers 76 and 84 to perform the movements that are required to achieve the later described cycle of movements of the deceleration pins 66 and 68. The distance through which the pins move at the various stages of the cycle will be dependent on the particular design of the projector and its operating conditions. In practice, the cam profiles will be designed in accordance with these criteria, pursuant to established engineering techniques. Accordingly, the profiles have not been shown in detail.

Synchronization of the cams with respect to one another and with respect to the projector is achieved by driving the two cams together from a common drive shaft coupled to the main rotor drive for the projector. The drive shaft is shown at 102 in FIG. 8 and it will be seen that the shaft extends vertically upwardly into the cam unit housing and is provided, within the housing, with respective support flanges 104 and 106 on which the cams 56 and 58 are disposed. The cams are held in place by a retaining disc 108 that is secured to the top of shaft 102 by a screw 110. The cams are located angularly with respect to one another and with respect to the drive shaft by a pin 112 that extends through both cams and through both cam support flanges on the drive shaft.

As was described previously, the deceleration pins 66 and 68 move in a cycle in which the pins initially engage the film at a film engaging position, then move in the direction of film travel to a film disengaging position while decelerating the film. The pins are then withdrawn from the film path to a retracted position and returned in a direction against the direction of film travel to the film engaging position, ready for reinsertion into the film path. For example, the film engaging and disengaging positions may correspond respectively to the full line and ghost outline positions of the arm 48 shown in the prior art illustration of FIG. 1. According to the invention, the film deceleration pins may be advanced into engagement with the film after the film loop has arrived (generally the condition shown in FIG. 1) or prior to arrival of the loop. Prior to loop arrival, the film is stationary and the deceleration pins can therefore be inserted at leisure and without contact into the perforations.

FIGS. 3 and 4 illustrate typical velocity profiles for the deceleration pins that may occur when the cam unit is configured to advance the pins respectively after loop arrival (FIG. 3) or prior to loop arrival (FIG. 4). Each view comprises two profiles denoted (a) and (b). These two profiles illustrate movement of the deceleration pins under the control, respectively, of cam 56 (deceleration) and cam 58 (pin advance and retract). The angular segments of the profiles are denoted in similar fashion to FIG. 2, but using subscript $D$ for the segments of the deceleration cam profile and subscript $A$ for the segments of the advance/retract cam profile. In each of FIGS. 3 and 4, the starting point is with the deceleration pins stationary after having positioned the film on the register pins at the aperture and come to rest. At this time, the pins should be slightly disengaged from the film perforations, in the sense that the pins should be centered within the perforations without any of the perforations' edges bearing significantly against the pins.

Referring first to FIG. 3(a), the first segment of the deceleration pin profile is the dwell segment $A_D$. During this segment, no motion is imparted to the pins by the deceleration cam. At the end of the segment, the acceleration pins begin to move against the direction of film travel. Segment $B_D$ represents acceleration of the pins in this reverse direction, followed by deceleration in segment $C_D$ and forward acceleration in segment $E_D$. The pins then enter a constant forward velocity segment $F_D$ followed by a deceleration segment $G_D$, a further constant velocity forward segment $H_D$ and segment $I_D$ in which the pins decelerate to rest.

FIG. 3(b) illustrates the motion that is simultaneously imposed on the pins by the advance/retract cam 58. The initial segment of the profile $A_A$ is a "dwell in" segment in which the pins are located in the perforations in the film. The pins are then withdrawn during acceleration segment $B_A$ and deceleration segment $C_A$. It will be noted that this motion occurs during dwell segment $A_D$ of the deceleration cam (FIG. 3(a)). The pins then remain in a dwell "out" position during segment $D_A$ while the deceleration cam is returning the pins during segment $B_D$ and the first part of segment $C_D$. The advance/retract cam 58 then advances the pins into the film path during segment $E_A$ (acceleration in) and $F_A$ (deceleration in) of profile (b). It will be seen that the end of this segment ($F_A$) coincides generally with the beginning of the constant velocity forward segment $F_D$ of the deceleration cam movement. In other words, the pins are moved into engagement with the film just as the deceleration cam begins its constant velocity forward motion with the film. This corresponds generally to the film loop position shown in FIG. 1 and the loop will subsequently be laid onto the deceleration pins during deceleration cam profile segment $F_D$, ready to be decelerated during segment $G_D$.

As mentioned previously, FIG. 4 shows a cam configuration in which the deceleration pins are inserted into the film before loop arrival; that is, prior to the condition shown in FIG. 1. At that time, the previous loop has passed by the deceleration cam unit and the film is stationary in the region of the cam unit.

The starting point for the profiles of FIG. 4 is the same as the starting point in FIG. 3, namely the deceleration pins are stationary in engagement with the film after having positioned the film on the register pins and come to rest slightly disengaged from the film perforations. The pins remain in this position during dwell segment $A_D$ of the deceleration cam, but are retracted from the film path by the pin advance and retract cam 58 during profile segments $B_A$ (acceleration out) and $C_A$ (deceleration out). The pins then remain in the out position during dwell segment $D_A$ while the deceleration cam accelerates the pins in the reverse direction and then decelerates the pins (during profile segments $B_D$ and $C_D$). The deceleration cam then provides a dwell segment $D_D$ during which the pins are stationary in the direction of film travel but the advance and retract cam 58 is inserting the pins into the film path (during acceleration and deceleration segments $E_A$ and $F_A$). As indicated previously, the film is stationary at this time and the pins can be inserted into the film path at leisure and without contact during dwell $D_D$ and prior to arrival of the next loop. As the leading end of that loop approaches the deceleration pins, the film is lifted off the pins while the portion of the film at the trailing end of the loop is laid back onto the pins as the film passes by. All of this occurs prior to end of dwell segment $D_D$ of the deceleration cam. The pins then remain in the film path during dwell segment $G_A$ while the deceleration cam accelerates the pins in the forward direction (segment $E_D$) followed by segments $F_D$ to $I_D$ during which the pins respectively move at constant velocity, are decelerated, again move at constant velocity and are again decelerated.

In both cam configurations, retraction of the deceleration pins from the film path promptly after the pins have laid the film onto the register pins at the aperture allows the pins to be returned against the direction of film travel and reinserted into the film in a relatively leisurely fashion as compared with the prior art arrangement disclosed in the Shaw patent in which the pins must be returned during the time it takes for a one-film loop to pass by the deceleration cam unit. The acceleration forces and resultant stresses on the internal components of the deceleration unit are accordingly reduced and the unit can be designed to operate at much higher frame rates and/or with narrower rotor gaps than was hitherto possible.

It will of course be appreciated that the preceding description relates to a particular preferred embodiment of the invention only and that many modifications are possible within the broad scope of the invention. For example, while a specific mechanical cam driven arrangement has been shown for effecting the required motion of the deceleration pins, it is conceivable that the required motion could be achieved "using other mechanical arrangements" such as rotating crank linkages, or other types of actuator such as electrical, pneumatic or hydraulic, and combinations of any of these, possibly with microprocessor control to produce the desired deceleration pin sequences. For example, a stepper motor drive controlled by computer could be used. Where a cam driven mechanism is used, it should be understood that the particular velocity profiles shown in FIGS. 3 and 4 are illustrative only and are not restrictive.

Normally, the "pin means" will comprise at least one pin and preferably two pins engageable in the respective sets of perforations that are normally provided along opposite margins of a motion picture film. However, other film perforation engageable elements could be used, e.g. a short-toothed rack-like element in which the teeth engage the film perforations.

It should also be noted that, while reference has been made specifically to the application of the present invention to a rolling loop mechanism of the form disclosed in the Shaw U.S. Pat. (No. 3,600,073), there is no limitation in this respect and that the invention may also be used with other forms of rolling loop mechanism. An example of such a mechanism is disclosed in U.S. Pat. No. 4,039,256 (Teeple, Jr. et al.).

We claim:

1. A projector, camera or like apparatus having a rolling loop film transport mechanism including a stator and a rotor adapted to co-operate to form continuous rolling loops in said film and to cause transportation thereof along a film path which includes an aperture at which successive portions of the film are intermittently held stationary in registration with the aperture;

wherein the improvement comprises means for decelerating the film as it approaches the aperture, comprising:

deceleration pin means engageable in marginal perforations in the film; and, means for driving said pin means in a cycle of movement in which the pin means is moved: into the film path at a film engaging position in advance of the aperture; in the direction of film travel to a film disengaging position while in engagement with and decelerating the film; out of the film path; and back to said film engaging position while remaining out of the film path; said cycle of movement being synchronized with said film transport mechanism so that each said successive film portion is decelerated as it approaches the aperture for registration.

2. An apparatus as claimed in claim 1, wherein said means for driving the pin means is synchronized with the film transport mechanism so that, at each said cycle, the pin means is moved into said film path and into engagement with the film at said film engaging position while the film is stationary and before the arrival of the next succeeding film loop at the location of the film decelerating means.

3. An apparatus as claimed in claim 1, wherein said means for driving the pin means is synchronized with the film transport mechanism so that, at each said cycle, the pin means is moved into the film path and into engagement with the film after arrival of a leading edge portion of a said film loop at said film engaging position.

4. An apparatus as claimed in claim 1, wherein said means for decelerating the film comprises a cam unit adapted to impart to said pin means a first reciprocatory motion in which the pin means is moved between an advanced position in the film path and a retracted position clear of the film path, and a second reciprocatory motion in which the pin means is moved in the direction of film travel and counter to said direction between said film engaging position and said film disengaging position, said reciprocatory motions being synchronized with one another to achieve said cycle of movement.

5. An apparatus as claimed in claim 4, wherein said cam unit comprises first and second rotary cams which are driven in synchronism with said film transport mechanism and which have respective profiled cam surfaces, respective cam follower means arranged to follow said cam surfaces, and means coupling said cam follower means and said pin means so that first cam causes first reciprocatory motion of the pins means and said second cam causes said second reciprocatory motion of the pin means.

6. An apparatus as claimed in claim 5, wherein said first and second rotary cams are arranged in superposed positions and are rotatable about a common vertical axis parallel to the axis of rotation of the rotor of the film transport mechanism, and wherein said profiled cam surfaces are formed on peripheral edges of the respective cams with said cam followers arranged to ride on said edges and move radially with respect to the common axis of rotation of the cams, said coupling means being adapted to translate said radial movements of the cam followers into corresponding said first and second reciprocatory motions of the pin means.

7. An apparatus as claimed in claim 6, wherein said coupling means includes lever crank means having a first arm that extends generally radially with respect to the rotor of the film transport mechanism and a second arm which extends generally tangentially with respect to said cams, said lever crank being turnable with respect to a pivot shaft which is disposed between said arms parallel to said rotational axis of the cams, said first arm carrying said pin means at an outer end thereof and said second arm carrying at an outer end thereof said cam follower for said second cam so that radial movement of the cam follower causes oscillation of the lever crank about its pivot shaft and results in said second reciprocatory motion of the pin means, and wherein said pivot shaft is carried adjacent an end of a pivot arm that carries adjacent its opposite end said cam follower for the first cam, said arm being pivotally mounted intermediate its said ends about a pivot axis parallel to said rotational axis of the cams, whereby radial movement of follower for said first cam causes corresponding movement of the pivot shaft towards and away from the rotor and results in said first reciprocatory motion of the pin means.

8. An apparatus as claimed in claim 7, wherein said first arm of the lever crank is duplicated by a second similar arm that is carried by said pivot shaft and extends parallel to said first arm of the lever crank, and wherein said pin means comprises upper and lower pairs of film perforation engaging pins projecting outwardly from ends of the respective arms for engagement in perforations along both margins of said film.

9. In a projector, camera or like apparatus having a rolling loop film transport mechanism including a stator and a rotor adapted to co-operate to form continuous rolling loops in said film and to cause transportation thereof along a film path which includes an aperture at which successive portions of the film are intermittently held stationary in registration with the aperture;

the improvement comprising means for decelerating the film as it approaches the aperture, comprising:

deceleration pin means engageable in marginal perforations in the film; and, means for driving said pin means in a cycle of movement in which the pin means is moved: into the film path at a film engaging position in advance of the aperture; in the direction of film travel to a film disengaging position while in engagement with and decelerating the film; out of the film path; and back to said film engaging position while remaining out of the film path; said cycle of movement being synchronized with said film transport mechanism so that each said successive film portion is decelerated as it approaches the aperture for registration.

10. A film deceleration unit for a projector, camera or like apparatus having a rolling loop film transport mechanism including a stator and a rotor adapted to cooperate to form continuous rolling loops in said film and to cause transportation thereof along a film path which includes an aperture at which successive portions of the film are intermittently held stationary in registration with the aperture, said unit being adapted to be located in advance of the aperture in the direction of film travelled and comprising:

deceleration pin means engageable in marginal perforations in the film; and, means for driving said pin means in a cycle of movement in which the pin means is moved: into the film path at a film engaging position in advance of the aperture; in the direction of film travel to a film disengaging position while in engagement with and decelerating the film; out of the film path; and back to said film engaging position while remaining out of the film path; said cycle of movement being synchronized with said film transport mechanism so that the film is decelerated by said pin means as each said successive film portion approaches the aperture for registration.

* * * * *